United States Patent
Geisberger et al.

(10) Patent No.: US 9,012,536 B2
(45) Date of Patent: Apr. 21, 2015

(54) WATER-BORNE PAINTS BASED ON EPOXY RESINS

(75) Inventors: Martin Geisberger, Graz (AT); Rosemaria Grasböck, Holzhausen (AT); Sandra Reisinger, Weiz (AT); Andreas Gollner, Graz (AT)

(73) Assignee: Allnex Austria GmbH, Werndorf (AT)

( * ) Notice: Subject to any disclaimer, the term of this patent is extended or adjusted under 35 U.S.C. 154(b) by 1083 days.

(21) Appl. No.: 12/671,587

(22) PCT Filed: Jul. 28, 2008

(86) PCT No.: PCT/EP2008/059898
§ 371 (c)(1),
(2), (4) Date: May 13, 2010

(87) PCT Pub. No.: WO2009/016162
PCT Pub. Date: Feb. 5, 2009

(65) Prior Publication Data
US 2011/0195195 A1    Aug. 11, 2011

(30) Foreign Application Priority Data

Aug. 2, 2007 (EP) ................................. 07015167

(51) Int. Cl.
| | | |
|---|---|---|
| *C08L 63/00* | (2006.01) | |
| *C09D 163/00* | (2006.01) | |
| *C08G 59/18* | (2006.01) | |
| *C08G 59/50* | (2006.01) | |
| *C08G 59/62* | (2006.01) | |

(52) U.S. Cl.
CPC ............ *C09D 163/00* (2013.01); *C08G 59/184* (2013.01); *C08G 59/50* (2013.01); *C08G 59/625* (2013.01)

(58) Field of Classification Search
USPC ................................................ 523/400, 414
See application file for complete search history.

(56) References Cited

U.S. PATENT DOCUMENTS

| | | |
|---|---|---|
| 2,703,765 A | 3/1955 | Osdal |
| 4,197,389 A | 4/1980 | Becker et al. |
| 4,608,405 A | 8/1986 | DeGooyer |
| 5,489,630 A | 2/1996 | Walker |
| 5,527,839 A | 6/1996 | Walker |
| 5,567,748 A | 10/1996 | Klein et al. |
| 7,300,963 B2 | 11/2007 | Birnbrich et al. |
| 2007/0073009 A1 | 3/2007 | Sabbadini et al. |
| 2008/0255271 A1 | 10/2008 | Raymond |

FOREIGN PATENT DOCUMENTS

| | | |
|---|---|---|
| CA | 2 124 831 | 6/1993 |
| EP | 1647584 A1 | 4/2006 |
| GB | 1016523 | 1/1966 |
| JP | 8-217873 | 8/1996 |
| JP | 9-176292 | 7/1997 |
| JP | 2007-2251 | 1/2007 |
| JP | 2008-260936 | 10/2008 |
| WO | 98/29467 | 7/1998 |
| WO | 2006/040024 | 4/2006 |

OTHER PUBLICATIONS

International Search Report and Written Opinion of PCT/EP2008/059898.

*Primary Examiner* — Megan McCulley
(74) *Attorney, Agent, or Firm* — Wenderoth, Lind & Ponack, L.L.P.

(57) ABSTRACT

An aqueous epoxy resin system AB is described comprising an aqueously dispersed epoxy resin A having, on the average, at least one epoxy group per molecule, and a water-soluble or water-dispersible curing agent B which comprises the reaction product of an amine B1 having at least one primary and/or at least one secondary amino group, an adduct B2 of a polyalkylene ether polyol B21 and an epoxide component B22, and an aromatic compound B3 having at least one acidic group selected from the group consisting of hydroxyl and carboxyl groups, which system can be applied by rolling, spraying or brushing to provide corrosion protection on base metals.

11 Claims, No Drawings

WATER-BORNE PAINTS BASED ON EPOXY RESINS

This application is the U.S. National Phase application of International Application No. PCT/EP2008/059898, filed Jul. 28, 2008 and published in English as WO2009/016162, which claims benefit of priority from European Patent Application No. 07015167.5, filed Aug. 2, 2007, each of which is incorporated by reference herein in its entirety.

The present invention relates to water-borne paints based on epoxy resins. Specifically, it relates to paints comprising a combination of a water-borne epoxy resin binder and a water-borne epoxy resin-based curing agent.

Water-borne paints comprising a water-dilutable epoxy resin and a water-dilutable curing agent based on reaction products of epoxy resins and amines have been described, i.a., in EP 0 000 605 B1. Such systems provide good corrosion resistance especially on base metal substrates such as steel sheets.

It is an object of this invention to improve the corrosion resistance further, particularly against brine as evidenced in the salt spray test.

This object has been achieved by providing an aqueous epoxy resin system AB comprising an aqueously dispersed epoxy resin A having, on the average, at least one epoxy group per molecule, and a water-soluble or water-dispersible curing agent B which comprises the reaction product of an amine B1 having at least one primary and/or at least one secondary amino group, an adduct B2 of a polyalkylene ether polyol B21 and an epoxide component B22, and an aromatic compound B3 having at least one acidic group selected from the group consisting of hydroxyl and carboxyl groups.

The invention also relates to a water-soluble or water-dispersible curing agent composition B which comprises the reaction product of an amine B1 selected from the group consisting of amines having at least one primary amino group and amines having at least one secondary amino group, an adduct B2 of a polyalkylene ether polyol B21 and an epoxide component B22, and an aromatic compound B3 having at least one acidic group selected from the group consisting of hydroxyl and carboxyl groups.

The invention also relates to coating compositions comprising the said aqueous epoxy resin system AB and at least one of pigments, fillers, further binders, and additives.

The invention further relates to a process of coating metal based substrates with the said aqueous epoxy resin system AB, which process comprises applying the said aqueous epoxy resin system AB to a metal based substrate by spraying, brushing, or rolling.

The water-soluble or water-dispersible curing agent B comprises the reaction product of an amine B1 selected from the group consisting of amines having at least one primary amino group and amines having at least one secondary amino group, an adduct B2 of a polyalkylene ether polyol B21 and an epoxide component B22, and an aromatic compound B3 having at least one acidic group selected from the group consisting of hydroxyl and carboxyl groups.

While reaction products of novolak-based epoxy resins with mononuclear aromatic compounds having at least two hydroxyl groups have been described in DE 14 70 785 A1, such reaction products merely serve to transform the otherwise liquid epoxy resins to solid ones. Besides dicarboxylic aromatic acids and dihydroxy aromatic compounds, also aromatic hydroxycarboxylic acids such as salicylic acid are disclosed. Reaction products of polyalkylene glycol modified epoxy resins, amines and the said aromatic compounds are neither mentioned nor made obvious.

The amines B1 are preferably purely aliphatic amines, i.e. those where only aliphatic organic groups which may be linear, branched or cyclic are present in the molecule. They may, however, also comprise such amines where the amine nitrogen atom is bound to an aliphatic carbon atom, while other parts of the molecule may also comprise aromatic moieties. It is preferred that the amine B1 is a diprimary diamine. Such amines are, e.g. the isomeric xylylene diamines, preferably meta-xylylene diamine. Preferred aliphatic amines are 1,4-diaminobutane, hexamethylene diamine, the isomeric trimethyl hexamethylene diamines, the isomeric bis-(aminomethyl)cyclohexanes, isophorone diamine, diethylene triamine, triethylene tetramine, tetraethylene pentamine, the higher diaminopolyethylene imines, 1-(2-aminoethyl)piperidine, 1-(2-aminoethyl)piperazine, N-(2-aminoethyl)-1,3-propane diamine, and N,N-bis(2-aminoethyl)-1,3-propane diamine as well as mixtures of two or more of these amines. Especially preferred are meta-xylylene diamine, isophorone diamine, diethylene triamine, triethylene tetramine, tetraethylene pentamine, and mixtures thereof.

The polyether polyols B21 are preferably addition products of alkylene oxides to polyfunctional alcohols or mixtures thereof, such as the diols ethylene and propylene glycol, neopentyl glycol, 1,4-butane diol, triols like glycerol, and higher polyfunctional alcohols such as pentaerythritol or sorbitol. It is also preferred that the mass fraction of such polyvalent (i.e. trifunctional or higher) alcohols does not exceed 10% of the mass of all alcohols. Especially preferred are polyethylene glycol and copolymers comprising oxyethylene and oxypropylene moieties, where at least a mass fraction of 20%, more preferably at least 30%, is constituted of oxyethylene groups.

The epoxy compounds B22 are preferably glycidyl ethers of dihydric alcohols or phenols, or novolaks, or glycidyl esters of dicarboxylic acids. Among the phenols, resorcinol, hydroquinone, 2,2-bis-(4-hydroxyphenyl)-propane (bisphenol A), mixtures of isomers of di-hydroxydiphenylmethane (bisphenol F), tetrabromo bisphenol A, 4,4'-dihydroxydiphenyl cyclohexane, 2,2-bis-(4-hydroxy-3-methylphenyl)-propane, 4,4'-dihydroxydiphenyl, 4,4'-di-hydroxybenzophenone, 1,1-bis-(4-hydroxyphenyl)-ethane, 2,2-bis-[4-(2'-hydroxypropoxy)-phenyl]-propane, 1,1-bis-(4-hydroxyphenyl)-isobutane, 2,2-bis(4-hydroxy-3-tert.-butylphenyl)-propane, bis-(2-hydroxynaphthyl)-methane, 1,5-dihydroxy naphthalene, tris-(4-hydroxyphenyl)-methane, bis-(4-hydroxyphenyl)ether, bis-(4-hydroxyphenyl)sulphone, as well as products of halogenation and hydration of the compounds mentioned. Epoxy resins based on bisphenol A are especially preferred.

They preferably have a specific epoxide group content (amount of substance of epoxide groups in the said epoxy compounds divided by the mass of the said epoxy compounds) of from 0.5 mol/kg to 10 mol/kg, especially preferably from 1.0 mol/kg to 7.0 mol/kg. They can be saturated or unsaturated, aliphatic and mixed aliphatic-aromatic compounds and have at least one, preferably at least two epoxide groups per molecule, on the average. They can also have hydroxyl groups in their molecules. It is also possible to use diepoxy alkanes made by epoxidation of diolefins. Particularly preferred are the diglycidyl ether of bisphenol A (BADGE) and bisphenol F, and epoxy resins based on advancement products of BADGE and bisphenol A. These BADGE based resins are commonly referred to as type 1, type 5, type 7 etc. resins, according to their degree of polymerisation. It is particularly preferred to use a mixture of BADGE and type 1 epoxy resins.

The adduct is made by reacting the polyether polyols B21 and the epoxy compounds B22 in the presence of a catalyst selected from the group consisting of Lewis acids such as boron trifluoride and complexes thereof with ethers or amines.

The aromatic compound B3 having at least one acidic group selected from the group consisting of hydroxyl and carboxyl groups is preferably derived from benzene, diphenyl, or naphthalene, or homologues thereof, i.e., lower alkyl substituted benzenes, diphenyls or naphthalenes such as toluene, xylene, 1- or 2-methyl naphthalene, 1,2- or 1,3- or 1,4- or 1,8- or 2,3-dimethyl naphthalene, or the corresponding ethyl-, propyl- or butyl-substituted benzenes, diphenyls, or naphthalenes, where linear, branched and mixed substituents are also encompassed. It is preferred to have at least two of the said acidic groups, with at least two hydroxyl groups or at least one hydroxyl group and at least one carboxyl group being especially preferred. Preferably, the aromatic compound B3 has at least two acidic groups whereof at least one is a hydroxyl group. Also preferred are aromatic compounds B3 having at least two acidic groups whereof at least one is a hydroxyl group and one is a carboxyl group. Compounds B3 having no hydroxyl groups have been found to be less satisfactory. Particularly preferred are resorcinol, salicylic acid, p-hydroxybenzoic acid, 2,4-dihydroxybenzoic acid (beta-resorcylic acid), 2,5-dihydroxybenzoic acid (gentisic acid), 2,6-dihydroxybenzoic acid (gamma-resorcylic acid), 3,4-dihydroxybenzoic acid (protocatechuic acid), 3,5-dihydroxybenzoic acid (alpha-resorcylic acid) 2-hydroxy-3-naphthoic acid, 2-hydroxy-6-naphthoic acid and alkyl derivatives of these such as 2-hydroxy-3-, -4-, and -5-methyl-benzoic acid (cresotic acids).

The epoxy resin A can be a non-modified or hydrophilically modified epoxy resin, selected from the same group as stated under B22. Hydrophilic modification of the epoxy resins is made according to the usual practice, by adding an adduct such as those described as B2 as an emulsifier to the epoxy resin, and dispersing the mixture, or by dispersing an unmodified epoxy resin in an aqueous dispersion of the emulsifier.

The aqueous epoxy resin system AB of the present invention is preferably made in a multi-step process, comprising as the first step, preparing an adduct B2 of a polyalkylene ether polyol B21 and epoxy resins or compounds B22, using Lewis acids or complex salts thereof as catalysts, adding B2 to the amine B1 in which the aromatic compound B3 has been dissolved, the amino groups of said amine B1 reacting with the epoxy groups of B2, preferably by consuming at least 90% of these epoxy groups, more preferred, at least 95%, and especially preferred, at least 98%, of the epoxy groups of B2, optionally adding an aliphatic polycarboxylic acid B4 which reacts with residual amine B1 at elevated temperature to form a polyamide or amide oligomer, removing the water formed by the reaction, preferably by azeotropic distillation, optionally adding a monoepoxy compound or a mixture of monoepoxy compounds B5, and optionally adding a polyamine, preferably a diamine B6, optionally, neutralisation of the resulting product with acid to convert at least 20% of the amino groups into the respective cations, and dispersing the optionally neutralised reaction product in water, and optionally adding further water to adjust the mass fraction of solids to between 40% and 80%.

The aromatic compound B3 is preferably dissolved in the amine B2 so that there results a clear solution free from undissolved solid material remaining from B3. An alternative route for the second step is to add the amine B1 in which the aromatic compound B3 has been dissolved to the adduct B2.

The curing agent B made in accordance with the steps as detailed supra is either admixed to an aqueous dispersion of an epoxy resin A which may be self-emulsified, such as by reaction of an epoxy resin with polyoxyethylene glycol, or externally emulsified by addition of an appropriate emulsifier, or an unmodified epoxy resin A is emulsified in water comprising the curing agent B, all variants leading to the epoxy resin system AB.

The polycarboxylic, preferably dicarboxylic, aliphatic acid B4 is optionally added to consume residual amine. It has surprisingly been found that the small portion of polyamide or amide oligomer formed in this reaction further enhances the properties of the aqueous epoxy resin system of the present invention. The acid B4 is preferably selected from the group consisting of adipic acid, glutaric acid, succinic acid, mixtures thereof, and also, other aliphatic dicarboxylic acids such as $C_7$- to $C_{12}$-acids, and fatty acid dimers having up to 50 carbon atoms.

It has also been found advantageous to include a reaction step where residual amine or also, amide oligomer is consumed by reaction with a monoepoxide B5, such as butyl glycidyl ether, hexyl glycidyl ether, 2-ethylhexyl glycidyl ether, or also, aromatic monoepoxy compounds such as cresyl or xylenyl glycidyl ethers. It is especially preferred to employ mixtures of aliphatic and aromatic glycidyl ethers.

It is also preferred to add further primary amine B6, especially diamine, in the last step before neutralisation, to enhance the hydrophilicity of the reaction product formed. Such diamines are preferentially chosen from diamines having two primary amino groups, namely cycloaliphatic diamines such as isophorone diamine, branched aliphatic amines such as trimethylhexane diamine isomers, and mixed aromatic-aliphatic amines having the amino groups bound to aliphatic carbon atoms such as meta-xylylene diamine and tetramethyl xylylene diamine.

It is preferred to include at least one of the optional steps of adding an aliphatic polycarboxylic acid B4, adding a monoepoxide B5, and adding a further amine B6.

The aqueous epoxy resin systems of the present invention, preferably made according to the process outlined supra, can be used in any epoxy resin based coatings. It has been found that such aqueous systems are especially suited for coating of base metals where they exhibit a markedly improved corrosion protection, particularly in contact with brine.

The invention is further illustrated in the following examples.

EXAMPLE 1

Preparation of a Polyalkylene Glycol-Modified Epoxy Resin 642 g of bisphenol A diglycidyl ether were mixed with 356 g of polyethylene glycol (number average molar mass 600 g/mol) and heated to 125° C. whereafter 2.4 g of a boron trifluoride benzylamine complex (®Anchor 1040, Air Products) were added, and the reaction mixture was kept at 140° C. until the specific content of epoxide groups had reached a value of approximately 2.4 mol/kg.

EXAMPLE 2

Preparation of a Curing Agent 19 g of salicylic acid were dissolved in 38.4 g of meta-xylylene diamine which had been heated to about 50° C. Stirring was continued until a clear solution had formed. This solution was further heated to about 80° C., and 17.5 g of the modified epoxy resin of Example 1 were added. Deionised water (75 g) was then added in two portions. A resin solution having an amine number of 219 mg/g and a mass fraction of solids of about 50% was obtained.

EXAMPLE 3

Preparation of Further Curing Agents

Example 2 was repeated, while replacing the salicylic acid in turn with 5.0 g of phthalic anhydride (Example 3.1), 5.0 g of isophthalic acid (Example 3.2), 5.0 g of resorcinol (Example 3.3), 5.0 g of benzoic acid (Example 3.4), 5.0 g of bisphenol A (Example 3.5), 10.0 g of the monohydrate of gallic acid (Example 3.6), 10.0 g of isophthalic acid (Example 3.7), 10.0 g of resorcinol (Example 3.8), 10.0 g of benzoic acid (Example 3.9), 10.0 g of bisphenol A (Example 3.10), 5.0 g of tetrahydrophthalic acid anhydride (Example 3.11), by nothing (Example 3.12, comparative), and replacing the amine(meta-xylylene diamine) by 4.8 g of isophorone diamine while keeping the same amount of salicylic acid in the mixture (Example 3.13).

EXAMPLE 4

Preparation of Coating Compositions

Clearcoats were prepared from 50 g of an aqueous epoxy resin dispersion of type 1 solid resin (®Beckopox EP 384w/53 WAMP, mass fraction of solids of 53%, Cytec Surface Specialties Germany GmbH & Co. KG) and the mass of curing agents of Example 3 as stated in table 1. The quantities of the curing agents were adjusted to have the same amount of substance of active amine hydrogen atoms.

TABLE 1

Composition of Clearcoats and Development of Pendulum Hardness

| Example | Curing Agent of Example | Mass of Curing Agent in g | Pendulum Hardness* (König) in s |
|---|---|---|---|
| 4.1 | 3.1 | 3.8 | 105 |
| 4.2 | 3.2 | 3.8 | 126 |
| 4.3 | 3.3 | 3.8 | 150 |
| 4.4 | 3.4 | 3.8 | 153 |
| 4.5 | 3.5 | 3.8 | 153 |
| 4.6 | 3.6 | 3.8 | 153 |
| 4.7 | 3.7 | 4.1 | 73 |
| 4.8 | 3.8 | 4.1 | 160 |
| 4.9 | 3.9 | 4.1 | 163 |
| 4.10 | 3.10 | 4.1 | 167 |
| 4.11 | 3.11 | 3.8 | 150 |
| 4 | 2 | 7 | 171 |

*as tested after seven days' drying at room temperature (23° C.), 50 μm dry film thickness, on glass plates As can be seen, with the exception of Examples 4.1, 4.2 and 4.7 (where aromatic compounds with only carboxyl groups have been used), the pendulum hardness has a good level of from 150 to 170 seconds.

EXAMPLE 5

Coatings Test

In a further test, the corrosion resistance of pigmented coatings comprising the aqueously dispersed epoxy resin as used in Example 4 and the curing agents of Example 2 (where salicylic acid as compound B3 is present, and the amine B1 is meta-xylylene diamine) and of Examples 3.12 (no compound B3) and 3.13 (salicylic acid as compound B3 and isophorone diamine as amine B1).

A pigmented binder dispersion was prepared using the following recipe:

A pigmented paint was made by charging a mixture of 36.2 g of ®Beckopox EP 384w/53 WAMP (as in Example 4), 1.3 g of ®Additol VXW 6208/60 (a polymeric non-ionic wetting and dispersing agent, Cytec Surface Specialties Austria GmbH), 0.3 g of ®Additol VXW 6393 (mineral oil based defoamer, Cytec Surface Specialties Austria GmbH), and 7.4 g of deionised water, adding thereto 21.6 g of a white titanium dioxide pigment (®Kronos 2190, Kronos International Inc.), 0.25 g of a yellow iron oxide pigment (®Bayferrox 3920, Lanxess Deutschland GmbH), 0.8 g of a black iron oxide pigment (®Bayferrox 306, Lanxess Deutschland GmbH), 2.5 g of barium sulphate (®EWO, Dr. Rudolf Alberti GmbH & Co.), 4.20 g of zinc phosphate (®Heucophos ZPO, Heubach GmbH), and 11.3 g of micronised talc (®Microtalc IT extra, Norwegian Talc AS), dispersing the mixture in a dissolver for about thirty minutes, and then letting down by adding further 10.8 g of the epoxy resin dispersion, 0.65 g of a coalescing agent (2,2,4-trimethyl-1,3-pentanediol-monoisobutyrate, ®Texanol, Eastman Chemical Company), 0.7 g of a polyurethane thickener (®Additol VXW 6388, Cytec Surface Specialties Austria GmbH), and 2 g of deionised water. 100 g each of this pigmented binder dispersion was mixed with 5 g of the curing agent of Example 2 (paint 5.1), 5.3 g of the curing agent of Example 3.13 (paint 5.2), and for a comparative test, 4.3 g of the curing agent of Example 3.12 (paint 5.3). These coating compositions were applied by spraying on non-treated steel panels (®Gardobond OC) and dried for seven days at room temperature (23° C.) and 50% relative humidity to yield dry film thicknesses of between 50 μm and 60 μm. These were treated in a salt spray test in accordance with EN ISO 9227 (NSS Test), each sample having been tested with and without central scratch. The surface appearance was assessed according to EN ISO 4628.

The results are listed in Table 2.

TABLE 2

Salt Spray Test

| | Paint | | | | | |
|---|---|---|---|---|---|---|
| | 5.1 | | 5.2 | | 5.3 | |
| Scratch | yes | no | yes | no | yes | no |
| Dry Film Thickness in μm | 55 | 55 | 58 | 61 | 51 | 61 |
| Blistering after 24 hours | OK | OK | OK | OK | OK, 2 rp | OK, 9 rp |
| Blistering at scratch | (S1) p | | (S2) p | | (S2) p | |
| creep from scratch in mm | 1.5 | | 1.5 | | 4.5 | |
| Blistering after 48 hours | OK | OK | OK | OK | OK, 2 rp | OK, 9 rp |
| Blistering at scratch | (S1) p | | 2 (S2) | | 1 (S3) | |
| creep from scratch in mm | 1.5 | | 1.5 | | 6 | |
| Blistering after one week | OK | OK | OK | OK | 2 (S4) | 1 (S2) |
| Blistering at scratch | 2 (S2) | | 2 (S3) | | | |
| creep from scratch in mm | 5 | | 4 | | delam. | |
| Blistering after two weeks | OK | OK | OK | OK | | 5 (S3) |
| Blistering at scratch | 3 (S2) | | 2 (S3) | | | |
| creep from scratch in mm | 8 | | 7 | | | |
| Blistering after three weeks | 1 (S3) | 1 rp | (S2) p | (S2) | | |
| Blistering at scratch | 3 (S3) | | 2 (S4) | | | |
| creep from scratch in mm | 13 | | 13 | | | |

OK: no blisters
p: partially
rp: rust points
delam.: complete delamination

Similarly favourable results have been obtained particularly for other aromatic hydroxycarboxylic acids as compounds B3. As can be seen from this table, the addition of a compound B3 markedly improves the corrosion resistance and extends the time to failure, while the nature of the amine component in the curing agent is not critical in this context.

The invention claimed is:

1. A process for the preparation of a water-dispersible curing agent B comprising the steps of
    preparing an adduct B2 of a polyalkylene ether polyol B21 and epoxy resins or epoxy compounds B22, using Lewis acids or complex salts thereof as catalysts,
    adding B2 to an amine B1 having at least one primary and/or at least one secondary amino group, in which an aromatic compound B3 having at least two acidic groups selected from the group consisting of hydroxyl and carboxyl groups has been dissolved, the amino groups of said amine B1 reacting with the epoxy groups of B2, by consuming at least 90% of the epoxy groups of B2,
    optionally adding an aliphatic polycarboxylic acid B4 which reacts with residual amine B1 at elevated temperature to form a polyamide or amide oligomer,
    removing the water formed by the reaction,
    optionally adding a monoepoxy compound or a mixture of monoepoxy compounds B5,
    and optionally adding a polyamine B6,
    optionally, neutralisation of the resulting product with acid to convert at least 20% of the amino groups into the respective cations, and
    dispersing the optionally neutralised reaction product in water, and
    optionally adding further water to adjust the mass fraction of solids to between 40% and 80%.

2. The process of claim 1 wherein the amino groups of said amine B1 are reacted with the epoxy groups of B2 by consuming at least 95% of the epoxy groups of B2.

3. The process of claim 1 wherein the amino groups of said amine B1 are reacted with the epoxy groups of B2 by consuming at least 98% of the epoxy groups of B2.

4. The process of claim 1 wherein the aromatic compound B3 has at least two acidic groups whereof at least one is a hydroxyl group.

5. The process of claim 1 wherein the aromatic compound B3 has at least two acidic groups whereof at least one is a hydroxyl group and one is a carboxyl group.

6. The process of claim 1 wherein the aromatic compound B3 is salicylic acid.

7. The process of claim 1 wherein the amine B1 is a diprimary diamine.

8. The process of claim 1 wherein the polyamine B6 is a diamine.

9. The process of claim 1 wherein the water-dispersible curing agent B has an amine number of from 120 mg/g to 300 mg/g.

10. A process for the preparation of an aqueous epoxy resin system AB wherein a water-dispersible curing agent B is made by the process of claim 1, and wherein either the said water-dispersible curing agent B is admixed to an aqueous solution or dispersion of an epoxy resin A having a specific epoxide group content of from 0.5 mol/kg to 10 mol/kg, or an aqueous dispersion of the said curing agent B is charged, and the epoxy resin A is emulsified in the said dispersion of the curing agent.

11. A method of use of the aqueous epoxy resin system AB obtained by the process of claim 10 for coating of base metals substrates comprising applying the said epoxy resin system to the said substrate by rolling, brushing or spraying.

* * * * *